April 13, 1965   R. D. PEELER   3,177,589
MACHINE TOOL TRAVEL INDICATOR
Filed March 12, 1963   2 Sheets-Sheet 1

INVENTOR.
ROBERT D. PEELER
BY
*Edward A. Sokolski*
ATTORNEY

April 13, 1965 R. D. PEELER 3,177,589
MACHINE TOOL TRAVEL INDICATOR
Filed March 12, 1963 2 Sheets-Sheet 2

INVENTOR.
ROBERT D. PEELER
BY
Edward A. Sokoloski
ATTORNEY

United States Patent Office 3,177,589
Patented Apr. 13, 1965

3,177,589
MACHINE TOOL TRAVEL INDICATOR
Robert D. Peeler, Inglewood, Calif., assignor to Dial Precision Machined Products Co. Inc., Hermosa Beach, Calif., a corporation of California
Filed Mar. 12, 1963, Ser. No. 264,506
7 Claims. (Cl. 33—172)

This invention relates to a machine tool travel indicator device and more particularly to such a device which enables the precise positioning of relatively movable members of a machine tool.

In performing precision machining, it is essential that the precise position of the movable portion of the tool relative to a predetermined reference point be ascertained. Devices of the prior art for accomplishing this end result have either tended to be of limited accuracy or overly complicated and somewhat unreliable in their operation.

Further, where highly precise measurements are to be made, it is essential that the critical working parts of the measuring instrument be protected from dirt, metal particles and other such factors which might impair the accuracy of the measurements. Devices of the prior art have tended to keep many of the essential working parts in such a position and exposed condition that they are subject to this type of external influence. Further, many devices of the prior art tend to have play in the coupling system between the drive input sensor and the indicator mechanism, thereby impairing the accuracy of the measurements made.

The device of this invention overcomes the shortcomings of the prior art devices in providing a machine tool indicator device in which the critical working parts are isolated from external effects by means of a closed case. The coupling mechanism is spring-loaded between the indicator device and the input sensor so that there is no significant play between these two points. The mechanism involved is relatively simple yet capable of highly accurate measurements.

It is therefore an object of this invention to provide an improved machine tool travel indicator device.

It is a further object of this invention to provide a machine tool travel indicator device capable of higher reliability operation than prior art devices.

It is still a further object of this invention to provide a machine tool travel indicator device of very simple construction which is capable of highly accurate measurements.

It is still a further object of this invention to facilitate the accurate measurement of machine tool travel.

Figure 1:
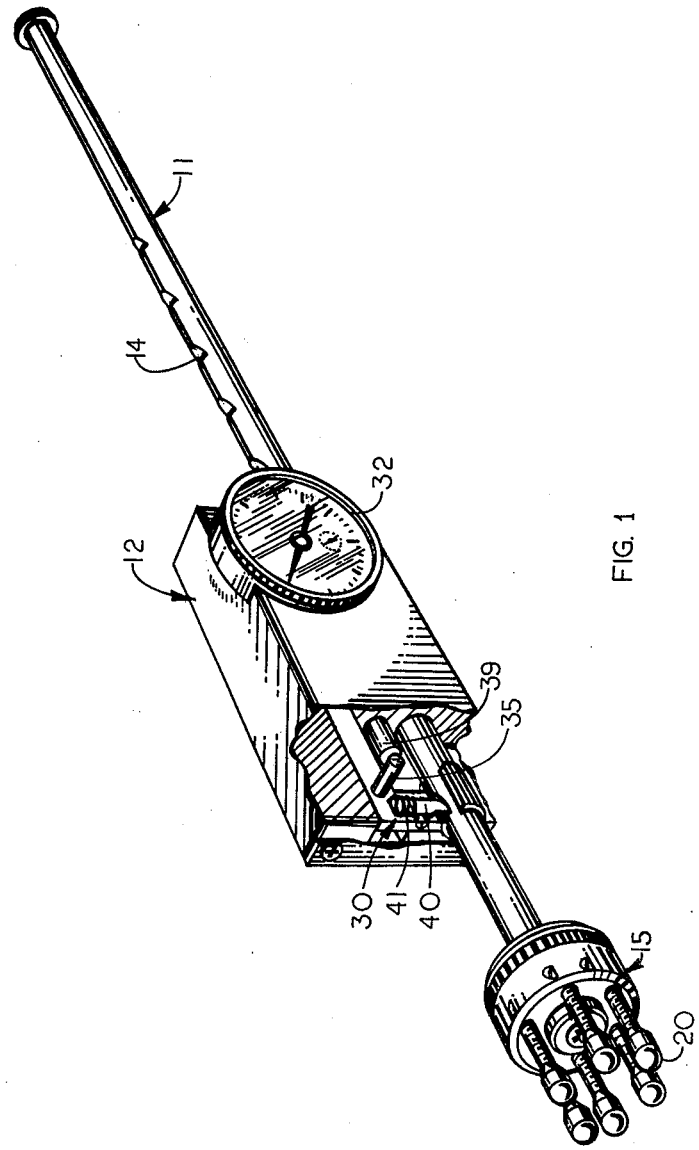
Figure 2:
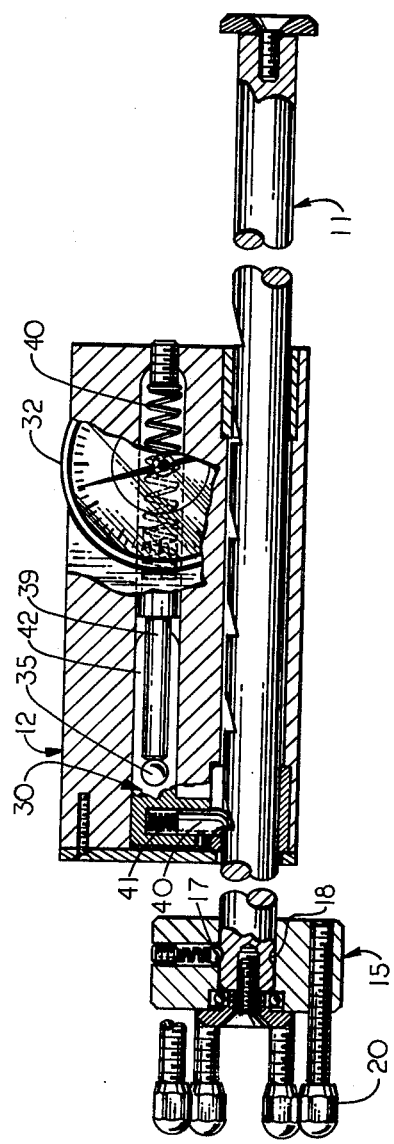

Other objects of this invention will become apparent from the following description taken in connection with the accompanying drawings of which:

FIG. 1 is a perspective view of a preferred embodiment of the device of the invention, and FIG. 2 is a sectional view of the embodiment of the invention shown in FIG. 1.

In the device of the invention a drive rod having a plurality of notches formed therein is slideably mounted in a casing. This drive rod has a plurality of notches formed therein which are spaced a predetermined distance from each other. A drive head which acts as a position sensor is rotatably mounted on the rod at one end thereof. The casing is fixedly mounted generally on a stationary portion of the machine tool such as for example, a portion of the frame thereof. The drive head is positioned so that it abuts against a movable portion of the machine tool such as for example, the carriage thereof. A lineal displacement indicator is fixedly mounted on the casing of the device with its input plunger mechanism contained within the casing. Slideably mounted within the casing is a drive bar which is spring-urged towards the drive head. Mounted on the drive bar is an actuator pin which moves with the drive bar and abuts against the input plunger of the displacement indicator.

Also mounted on the drive bar is a pawl which is shaped so that it mates with the notches in the drive rod. The pawl abuts against a vertical wall of the notch which is towards the drive head, thereby engaging the rod and causing the drive bar to travel with the rod when the drive head is driven by the machine tool carriage. The drive bar in turn actuates the displacement indicator so that displacement of the drive head is transferred to the input of this indicator. The drive rod does not engage the pawl when it is moved in the direction opposite to the drive direction.

Referring now to FIGS. 1 and 2 a preferred embodiment of the device of the invention is shown. Drive rod 11 is slideably mounted in casing 12. Drive rod 11 has a plurality of notches 14 formed therein which are spaced an equal distance from each other. This distance may, for example, be one inch for utilization with a standard displacement indicator. Mounted on one end of drive rod 11 is a drive head 15. Drive head 15 is mounted for rotation on the rod with a spring actuated ball 17 being retained in the head which falls into a series of mating spherical grooves 18 formed around the circumference of the rod. The grooves 18 are positioned at distinct positions around the rod to provide predetermined resting points for head 15.

Head 15 has a plurality of adjustable actuator pins 20 threadably mounted therein. These pins can be adjusted to extend various distances from the drive head as desired. The actuator pins 20 may be positioned against various objects on the carriage to provide predetermined reference starting positions. Each actuator pin thus can be utilized for a different starting position by rotation to bring it into abutment against the particular desired reference object.

Slideably mounted within case 12 is drive bar 30. Fixedly mounted in casing 12 is lineal displacement indicator 32. This displacement indicator may, for example, be one manufactured by the Starrett Company of Athol, Massachusetts having a total range of one inch and capable of making measurements within a thousandth of an inch. Drive bar 30 has an actuator pin 35 mounted thereon which abuts against the input plunger 39 of the displacement indicator. Input plunger 39 is positioned within a channel 42 formed in the casing.

Also mounted in the drive bar is pawl 40 which is spring-urged against drive rod 11 by spring 41. Pawl 40 has a forward edge which mates with the forward edges of each of grooves 14. The rear edge of pawl 40 is rounded so that it slides along the rear edges of notches 14 when the drive rod 11 is moved from right to left in the device as illustrated in FIGS. 1 and 2. When drive rod 11 is driven to the right with the actuation of drive head 15 by the machine tool member against which one or more of the pins 20 abuts, the forward edge of pawl 40 will catch against the forward edge of one of the grooves 14 of the rod, and drive bar 30 will be driven along with the drive head. Drive bar 30 will carry input plunger 39 along with it by virtue of the action of pin 35. Thus, the input drive will be transmitted to displacement indicator 32.

Drive bar 30 is urged towards drive head 15 by spring 40 which is of relatively heavy construction and maintains the leading edge of pawl 40 firmly against the leading edge of one of the notches 14. This minimizes the play in the drive system and thereby enhances the accuracy of the measurements made.

Rod 11 can be moved past the pawl 40 in the general direction from left to right in the device as illustrated, by rotating the rod 11 to a position 90° from that shown in the figures. Pawl 40 will then abut against the unnotched surface of the rod and will not catch thereon. The utilization of notches 14 at precise intervals along the rod, permits the utilization of various measurement starting points which are a known distance from each other, thereby greatly facilitating measurements. Preferably, notches 14 are vertically positioned when the rod is in its normal operating position thereby minimizing the possibility of scrap filings catching in these notches and impairing the operation of the mechanism.

In the utilization of the device of the invention with a machine tool such as a lathe, the casing 12 may be fixedly attached to a normally stationary portion of the lathe such as the headstock. Head 15 is then positioned so that it abuts against a reference member on the lathe carriage. Movement of the carriage towards casing 12, then, will be accurately indicated on displacement indicator 32. Precise measurements to within one thousandth of an inch have been made with operative embodiments of the device of the invention. Closer measurements could be made with a displacement indicator having a higher definition.

The device of this invention thus provides a simple yet highly accurate instrument for measuring the travel of a machine tool. While the device of the invention has been described and illustrated in detail it is to be clearly understood that this is intended by way of illustration and example only and is not to be taken by way of limitation, the spirit and scope of this invention being limited only by the terms of the following claims.

I claim:

1. A machine tool travel indicator device comprising
 a casing,
 a drive rod having a plurality of notches formed therein slideably mounted in said casing,
 a drive head mounted on said rod at one end thereof,
 a lineal displacement indicator fixedly mounted in said casing, said indicator having an input plunger,
 a drive bar slideably mounted in said casing,
 spring means for urging said bar towards said drive head,
 an actuator pin mounted on said drive bar, said actuator pin abutting against the input plunger of said displacement indicator,
 a pawl mounted in said drive bar, and
 spring means for urging said pawl against said drive rod, said pawl being adapted for mating engagement with the notches of said drive rod,
 whereby when said drive head is driven towards said casing, said pawl engages said drive rod and said displacement indicator is actuated in accordance with relative movement between said drive head and said casing.

2. The device as recited in claim 1 wherein said casing has a channel formed therein for receiving said displacement indicator plunger, said plunger being fully contained within said channel.

3. A machine tool travel indicator device comprising
 a casing,
 a drive rod having a plurality of notches formed therein slideably mounted in said casing,
 a drive head mounted on said rod at one end thereof,
 a lineal displacement indicator fixedly mounted in said casing, said indicator having an input plunger, said casing having a channel formed therein for receiving said plunger,
 a drive bar slideably mounted in said casing,
 spring means for urging said bar towards said drive head,
 means for connecting said drive bar in driving engagement with the input plunger of said displacement indicator,
 a pawl having a steep leading edge and a rounded rear edge mounted in said drive bar, and
 spring means for urging said pawl against said drive rod with the leading edge of said pawl in mating engagement with the forward edges of the notches of said drive rod,
 whereby when said drive head is driven towards said casing, said pawl engages said drive rod and said displacement indicator is acuated in accordance with relative movement between said drive head and said casing.

4. The device as recited in claim 3 wherein said drive head is rotatably mounted on said rod and has a plurality of position pins positionally adjustable relative thereto along axes parallel to the longitudinal axis of said rod.

5. A machine tool travel indicator device comprising
 a casing,
 a drive rod having a plurality of notches formed therein slideably mounted in said casing, said notches being spaced along said rod a predetermined distance from each other,
 a drive head rotatably mounted on said rod at one end thereof, said drive head having a plurality of position pins adjustable relative thereto along axes parallel to the longitudinal axis of said rod,
 a lineal displacement indicator fixedly mounted in said casing, said indicator having an input plunger,
 a drive bar slideably mounted in said casing,
 spring means for urging said bar towards said drive head,
 an actuator pin mounted on said drive bar, said actuator pin abutting against the input plunger of said displacement indicator,
 a pawl mounted in said drive bar, and
 spring means for urging said pawl against said drive rod, said pawl being adapted for mating engagement with the notches of said drive rod.

6. The device as recited in claim 5 wherein said pawl has a leading edge shaped for mating engagement with the leading edges of said notches, the rear edge of said pawl being rounded to slide over the rear edges of said notches.

7. The device as recited in claim 5 wherein said drive bar, said drive rod, and said input plunger are slideably mounted for motion along axes parallel to each other.

References Cited by the Examiner

UNITED STATES PATENTS 2,236,881   4/41   Rusnak _____ 33—125

ISAAC LISANN, *Primary Examiner.*